United States Patent
Keyton

(10) Patent No.: US 8,500,197 B2
(45) Date of Patent: Aug. 6, 2013

(54) TOWEL SEAT COVER

(76) Inventor: Susan Keyton, Fayette, MO (US)

( * ) Notice: Subject to any disclaimer, the term of this patent is extended or adjusted under 35 U.S.C. 154(b) by 401 days.

(21) Appl. No.: 12/876,447

(22) Filed: Sep. 7, 2010

(65) Prior Publication Data

US 2012/0056455 A1    Mar. 8, 2012

(51) Int. Cl.
*A47C 31/11*    (2006.01)

(52) U.S. Cl.
USPC ............................... 297/224; 297/228.12

(58) Field of Classification Search
USPC ............... 297/228.12, 224, 219.1, 228.1, 229
See application file for complete search history.

(56) References Cited

U.S. PATENT DOCUMENTS

| | | | |
|---|---|---|---|
| 1,538,538 A * | 5/1925 | Wood | 297/229 |
| 1,857,418 A * | 5/1932 | Wedler | 297/219.1 |
| RE24,279 E * | 2/1957 | Schutte et al. | 297/227 |
| 2,884,993 A * | 5/1959 | Schutte | 297/227 |
| 3,066,435 A * | 12/1962 | Oddo et al. | 297/219.1 |
| 3,195,950 A * | 7/1965 | Mednick | 297/227 |
| 3,804,457 A * | 4/1974 | Hellman | 297/219.1 |
| 4,092,049 A * | 5/1978 | Schoblom | 297/440.23 |
| 4,232,898 A * | 11/1980 | Bodrero | 297/228.1 |
| 4,232,899 A * | 11/1980 | Fister, Jr. | 297/229 |
| 4,273,380 A * | 6/1981 | Silvestri | 297/188.06 |
| 4,553,785 A * | 11/1985 | Duke et al. | 297/229 |
| 4,718,721 A * | 1/1988 | Pompa | 297/228.11 |
| 4,725,094 A * | 2/1988 | Greer | 297/229 |
| 4,887,865 A * | 12/1989 | Dawidzon | 297/382 |
| 5,005,901 A * | 4/1991 | Hinde | 297/229 |
| 5,028,472 A * | 7/1991 | Gray | 428/100 |
| 5,150,947 A * | 9/1992 | Croshaw | 297/229 |
| 5,161,275 A * | 11/1992 | Simpson et al. | 5/627 |
| 5,234,252 A * | 8/1993 | Wallach | 297/229 |
| 5,265,933 A * | 11/1993 | Croshaw | 297/228.1 |
| 5,275,463 A * | 1/1994 | Rocha | 297/229 |
| 5,333,921 A * | 8/1994 | Dinsmoor, III | 297/219.1 |
| 5,403,066 A * | 4/1995 | Drum | 297/219.1 |
| 5,618,082 A * | 4/1997 | Jachmich | 297/229 |
| 6,135,635 A * | 10/2000 | Miller et al. | 383/2 |
| 6,149,234 A * | 11/2000 | Daniels | 297/229 |
| 6,312,051 B1 * | 11/2001 | Adams | 297/228.11 |
| 6,541,096 B1 * | 4/2003 | Richards et al. | 428/99 |
| 6,637,815 B1 * | 10/2003 | Louque et al. | 297/184.11 |
| 6,736,453 B2 * | 5/2004 | Chambers et al. | 297/228.1 |
| 7,055,907 B1 * | 6/2006 | Tilby | 297/380 |
| 7,172,246 B1 * | 2/2007 | Itakura | 297/219.1 |
| 7,287,813 B2 * | 10/2007 | Aliev | 297/219.1 |
| 7,419,213 B2 * | 9/2008 | Itakura | 297/219.1 |
| 7,438,356 B2 * | 10/2008 | Howman et al. | 297/180.11 |

(Continued)

FOREIGN PATENT DOCUMENTS

GB    2257356 A    *    1/1993
WO    WO 9412366 A1    *    6/1994

*Primary Examiner* — David E. Allred
(74) *Attorney, Agent, or Firm* — The Law Office of Jerry D. Haynes

(57) ABSTRACT

A seat cover apparatus comprising: a nylon stretch portion; a terry cloth towel portion, where said terry cloth towel portion extends over the nylon stretch portion; and an attachment means, where said attachment means enables the attachment of the nylon stretch portion to a seat portion. In one particular embodiment, the attachment means includes at least four Velcro straps, wherein the Velcro straps are used to secure the seat cover over a boating seat. The nylon stretch portion covers the seat and the terry cloth towel portion extends downwardly beyond the seat. The terry cloth portion supplies a means to wipe one's hands while enjoying boating activities.

6 Claims, 1 Drawing Sheet

U.S. PATENT DOCUMENTS

| | | | |
|---|---|---|---|
| 7,581,788 B1* | 9/2009 | Johnson | 297/229 |
| 2002/0043834 A1* | 4/2002 | Jackson et al. | 297/228.1 |
| 2002/0096919 A1* | 7/2002 | Sparks | 297/228.12 |
| 2003/0006634 A1* | 1/2003 | Hyduk | 297/229 |
| 2005/0225134 A1* | 10/2005 | Tseng | 297/219.1 |
| 2007/0145797 A1* | 6/2007 | Itakura | 297/228.1 |
| 2009/0028466 A1* | 1/2009 | Bailey | 383/4 |
| 2009/0108650 A1* | 4/2009 | Ditwiler | 297/219.1 |
| 2010/0001565 A1* | 1/2010 | Gray et al. | 297/229 |
| 2011/0127816 A1* | 6/2011 | Hampton | 297/229 |
| 2011/0260512 A1* | 10/2011 | Renda | 297/219.1 |
| 2011/0291447 A1* | 12/2011 | Mount et al. | 297/216.13 |
| 2012/0242125 A1* | 9/2012 | Burns | 297/219.1 |

* cited by examiner

TOWEL SEAT COVER

BACKGROUND OF THE INVENTION

1. Field of Invention

The present invention relates to a seat cover for seats on a recreational boat deck.

2. Description of Related Art

Recreational boating is an activity enjoyed by many individuals. Boats utilized for recreational boating may be either powerboats, sailboats or in certain instances yachts. Recreational boating may involve boats of various sizes including runabouts from the 15 to 25 foot range as well as cruising powerboats with cabins that are sized up to about 65 feet. One common characteristic of many recreational boats involves deck seats provided in the deck area to enjoy the pleasure of riding, fishing or other water sport activities.

Since boating takes usually place during the daytime in fairly good weather, individuals and the boat are exposed to a significant amount of sunlight. Furthermore, recreational water sports are usually enjoyed during the summer months and thus the heat becomes a factor while participating in these activities related to recreational boating.

One drawback to recreational boating involve the seats located on the decks of boats that consequently heat up due to exposure to the sun over the course of the day. Many seats provided on boats are manufactured of leather, vinyl, or other highly heat-absorbing materials. Therefore, unless an individual is seated in these seats, these seats may become quite warm over the day and can be uncomfortable to sit on after exposure to the sun.

The prior art has provided various materials that may be utilized for seat covers. The seat covers provided usually cover the seat entirely and provide protection for sun exposure. Seat covers are essential in controlling the temperatures of the seats when not occupied by individuals. Seat covers are usually designed for particular seats and lack versatility in their ability to be used in various types of seats. It would therefore be advantageous to have a seat cover that could be utilized in a variety of seats and yet provide sufficient protection from sun exposure.

SUMMARY OF THE INVENTION

The present invention relates to a seat cover apparatus comprising: a nylon stretch portion; a terry cloth towel portion, where said terry cloth towel portion extends over the nylon stretch portion; and an attachment means, where said attachment means enables the attachment of the nylon stretch portion to a seat portion.

In one particular embodiment, the attachment means includes at least four hook and loop straps, wherein the hook and loop straps are used to secure the seat cover over a boating seat. The nylon stretch portion covers the seat and the terry cloth towel portion extends downwardly beyond the seat. The terry cloth portion supplies a means to wipe one's hands while enjoying boating activities.

DETAILED DESCRIPTION

The present invention relates to a seat cover that includes a towel portion over a nylon material that is attached to a seat via the use of Velcro straps. The present invention provides a terry cloth seat cover that allows a person to feel dry and cooler while sitting on a boating seat. The terry cloth portion of the seat cover hangs over each side of the seat that allows the user to wipe his or her hands while fishing. The present invention also may be attached to the back support area of a seat to provide cushioning and cover for the back support area.

Figure 1:
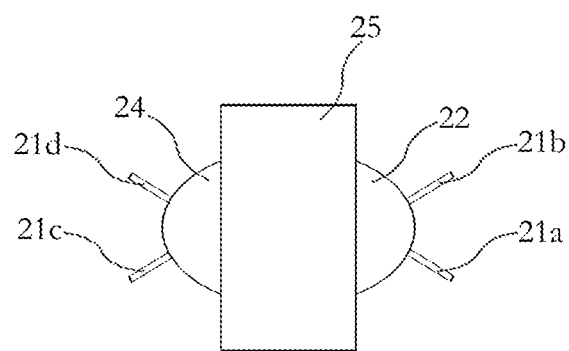
FIG. 1 depicts a towel seat cover according to the present invention.

FIG. 1 provides an overview of the towel seat cover according to the present invention. Four Velcro straps 21a, 21b, 21c, 21d provide a means for attaching the seat cover 10 to a seat. Seat cover 10 further includes a terry cloth towel portion 25 and a stretched nylon portion 22, 24. The stretched nylon portions 22, 24 extend over the sides of the terry cloth portion 25 to provide an attachment means to the seat of a boating chair. The Velcro straps 21a-21d secure the seat cover 10 and the stretch nylon 22, 24 allows the seat cover 10 to fit over various sizes of boating seats without requiring a precise fit. The Velcro straps 21a-21d provide a means to adjust the position of the seat cover as desired.

As noted the terry cloth portion 25 extends beyond the nylon portions 22, 24 in a preferred embodiment of the present invention and also lies beyond the edge of the seat. The extra extension of the terry cloth portion 25 provides a means to wipe ones hands while enjoying the boating activities.

Figure 2:
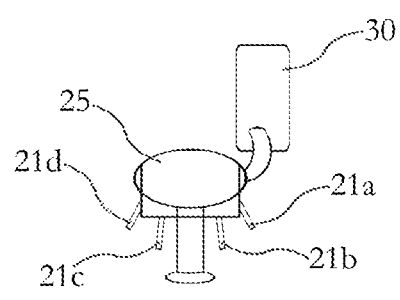
FIG. 2 depicts the towel seat cover according to the prevent invention placed over a pedestal stool seat.

FIG. 2 depicts the towel seat cover 10 over a pedestal chair 30. As noted the terry cloth portion 25 extends over the edge of the seat as intended. The seat cover 10 therefore covers the entire seat area and protects the seat from exposure to the sun. This protection allows the seat to remain cool and comfortable for the user thereof. In addition to providing the seat cover, the terry cloth portion 25 provides a means for additional uses related to boating activities as desired by the user.

Figure 3:
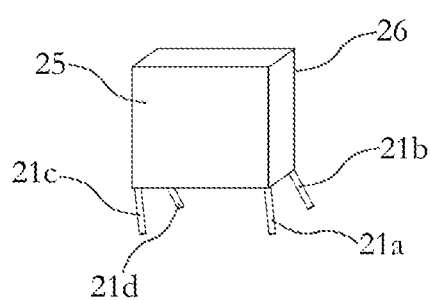
FIG. 3 demonstrates the use of the seat cover according to the present invention over a back support of a seat.

The seat cover 10 may also be placed over a back support area 26 of a seat as depicted in FIG. 3. When stretched over the back support 26, the terry cloth portion 25 extends on the entire back portion therefore covering it from exposure to the sun. The Velcro straps 21a-21d are attachable and allow for the attachment of the seat cover over the back support area.

The seat cover 10 therefore provides a means to complement one's enjoyment of recreational boating by protecting the boat seats from exposure to hot sun over long periods of time. Users thereof do not have to endure the uncomfortable leather or vinyl seats that are provided on most of the boats known in the prior art. Furthermore, the seat cover 10 is flexible so that it may be used on various size seats and back support areas for protective purposes.

What is claimed is:

1. A seat cover apparatus comprising:
   a. a terry cloth towel portion having at least two side edges corresponding to a length of the terry cloth towel portion;
   b. a nylon stretch portion connected to the terry cloth towel portion along a major portion of each of the side edges;
   c. a terry cloth towel portion, where said terry cloth towel portion extends over the nylon stretch portion, where the nylon portion extends in a side direction beyond each of the side edges of the terry cloth portion; and
   d. an attachment straps having ends attached to each of the nylon stretch portions in areas of the nylon stretch portions beyond said terry cloth towel portion, where said attachment straps enables the attachment of the nylon stretch portion to a seat portion.

2. The seat cover apparatus according to claim 1, where said attachment straps includes at least four Velcro straps.

3. The seat cover apparatus according to claim 2, wherein said Velcro straps are used to secure the seat cover over a boating seat.

4. The seat cover apparatus according to claim 3, wherein the nylon stretch portion covers the seat and the terry cloth towel portion extends downwardly beyond the seat.

5. The seat cover apparatus according to claim 4, where the terry cloth portion supplies a means to wipe one's hands while enjoying boating activities.

6. The seat cover apparatus according to claim 1, where said seat cover is placed over a back support area of a seat and applies coverage of the back support area to prevent exposure to sun.

* * * * *